(12) United States Patent
Dallas et al.

(10) Patent No.: US 9,403,197 B2
(45) Date of Patent: Aug. 2, 2016

(54) MEDICAL WASTE BREAK DOWN AND SOLID WASTE DISPOSAL SYSTEM

(71) Applicants: Milton Dallas, Burlington, WI (US);
Russ Robers, Burlington, WI (US);
Edward Hermann, Greenfield, WI (US)

(72) Inventors: Milton Dallas, Burlington, WI (US);
Russ Robers, Burlington, WI (US);
Edward Hermann, Greenfield, WI (US)

( * ) Notice: Subject to any disclaimer, the term of this patent is extended or adjusted under 35 U.S.C. 154(b) by 56 days.

(21) Appl. No.: 14/325,530

(22) Filed: Jul. 8, 2014

(65) Prior Publication Data
US 2016/0008860 A1 Jan. 14, 2016

(51) Int. Cl.
| | |
|---|---|
| A62D 3/30 | (2007.01) |
| B09B 3/00 | (2006.01) |
| B65D 1/02 | (2006.01) |
| B65D 50/00 | (2006.01) |
| B65D 51/18 | (2006.01) |
| B65D 43/02 | (2006.01) |
| B65D 23/02 | (2006.01) |
| B65D 51/16 | (2006.01) |
| B01J 19/24 | (2006.01) |
| B65D 85/82 | (2006.01) |

(52) U.S. Cl.
CPC ............ *B09B 3/0075* (2013.01); *A62D 3/30* (2013.01); *B01J 19/24* (2013.01); *B65D 1/0246* (2013.01); *B65D 23/02* (2013.01); *B65D 43/0204* (2013.01); *B65D 50/00* (2013.01); *B65D 51/16* (2013.01); *B65D 51/1611* (2013.01); *B65D 51/1616* (2013.01); *B65D 51/1644* (2013.01); *B65D 51/18* (2013.01); *B01J 2219/0025* (2013.01); *B01J 2219/00245* (2013.01); *B01J 2219/00256* (2013.01); *B01J 2219/24* (2013.01); *B65D 85/82* (2013.01); *B65D 2251/009* (2013.01); *B65D 2251/0028* (2013.01); *B65D 2251/0093* (2013.01); *B65D 2543/00425* (2013.01)

(58) Field of Classification Search
CPC ...................................................... A62D 3/36
See application file for complete search history.

(56) References Cited

U.S. PATENT DOCUMENTS

| | | | |
|---|---|---|---|
| 4,919,569 A | 4/1990 | Wittenzelliner | |
| 5,783,535 A * | 7/1998 | Isobe | A61K 8/345 510/119 |
| 5,968,881 A * | 10/1999 | Haeggberg | C11D 1/722 134/25.2 |
| 6,010,444 A | 1/2000 | Honeycutt et al. | |
| 7,918,776 B2 | 4/2011 | Day | |
| 8,490,795 B2 | 7/2013 | Ziemba | |
| 2005/0233914 A1* | 10/2005 | Grascha | A61K 8/37 510/130 |
| 2009/0131732 A1* | 5/2009 | Day | A61L 11/00 588/249.5 |
| 2010/0258565 A1* | 10/2010 | Isaacson | B09B 3/0075 220/324 |

* cited by examiner

*Primary Examiner* — Sean E Conley
*Assistant Examiner* — Donald Spamer
(74) *Attorney, Agent, or Firm* — Absolute Technology Law Group, LLC

(57) ABSTRACT

A system for breaking down medical waste for safe disposal includes a novel disposal solution for dissolving and dispersing the medical waste, as well as a hardening agent that solidifies the disposal solution to prevent it from contaminating the environment after disposal. The novel disposal solution includes a dispersion agent that dissolves the medical waste in addition to a neutralizer, which binds to the dissolved medical waste to render it inert. The disposal solution can optionally include defoaming, preservation and/or antifreeze agents. The system may also include a vessel with a vented cap for storing the disposal solution prior to and during use. The vessel may also be used to discard the disposal solution and broken-down medical waste after the disposal solution solidifies.

13 Claims, 1 Drawing Sheet

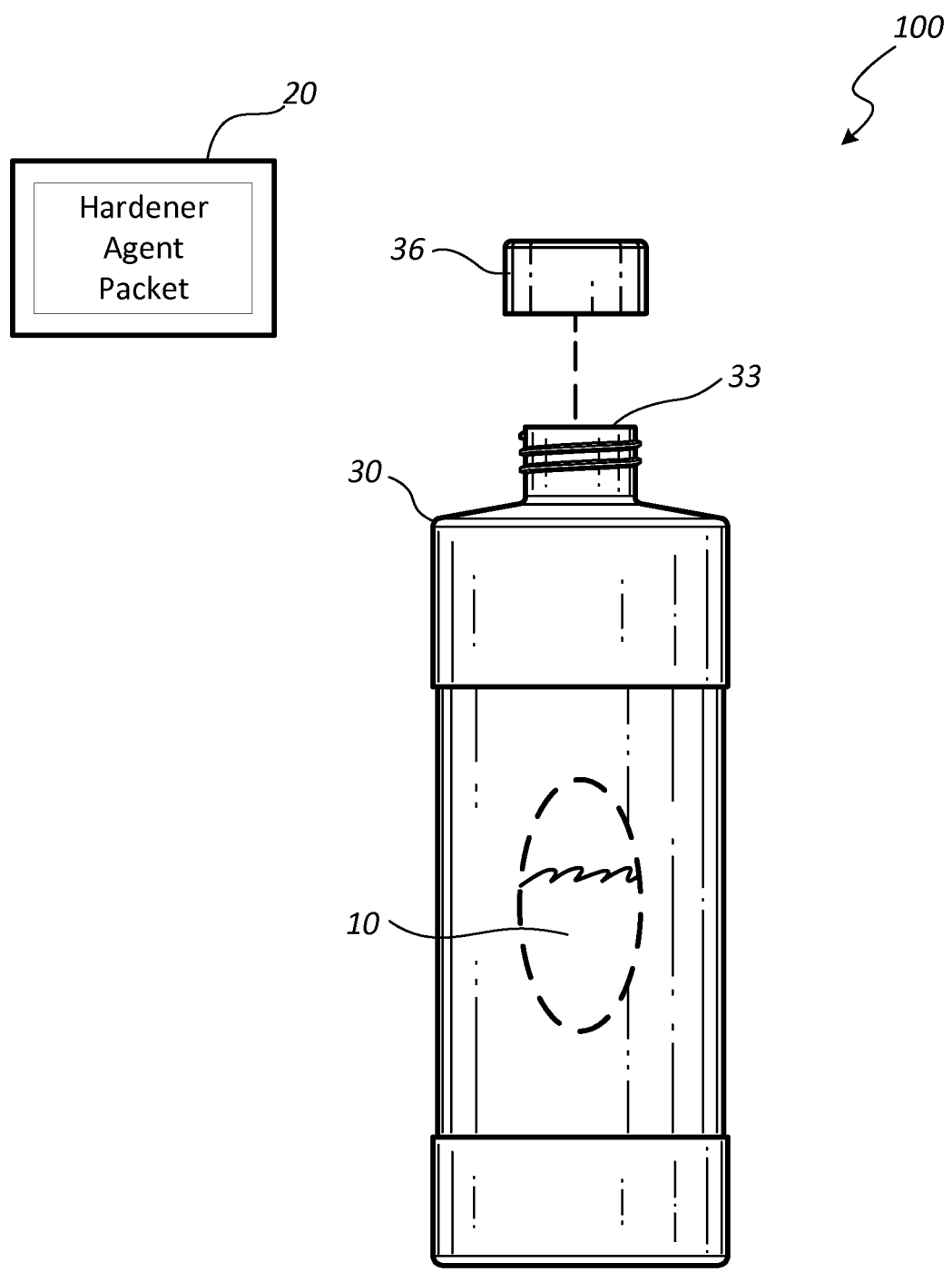

MEDICAL WASTE BREAK DOWN AND SOLID WASTE DISPOSAL SYSTEM

CROSS-REFERENCE TO RELATED APPLICATIONS

This application is a continuation-in-part of U.S. application Ser. No. 14/186,098, filed on Feb. 21, 2014, hereby incorporated by reference in its entirety, which claims priority to U.S. Provisional Application No. 61/940,301 filed on Feb. 14, 2014.

FIELD OF INVENTION

This invention relates to the field of medical waste disposal, and more specifically to a system that breaks down medical waste for safe disposal.

BACKGROUND

The Secure and Responsible Drug Disposal Act of 2010 noted a sharp rise in deaths, injuries and crimes tied to the abuse of prescription drugs. Accidental overdose deaths involving prescription opioids more than doubled over a four-year period, while the number of treatment admissions for prescription opioids increased 74 percent. Over a five-year period, violent crimes and property crimes associated with abuse and theft of prescription drugs increased in every region of the United States. The largest population of new abusers of prescription drugs is teenagers; among teenagers, prescription drugs were the second most-abused drug.

Disposal of unused, unwanted, or expired prescription and non-prescription drugs is a challenging task. Agents and offices of the Drug Enforcement Agency (DEA) can take possession of prescription drugs or direct the owner to a "reverse distributor" capable of disposing of prescription drugs. Some state and local law enforcement agencies also have established drug disposal programs to facilitate the collection and destruction of prescription drugs.

If official collection is unavailable, the Federal Drug Administration (FDA) recommends mixing prescription drugs with "unpalatable" substances such as used kitty litter or coffee grounds. The FDA also suggests that highly toxic or dangerous prescription drugs, such as morphine, oxycodone and Percocet, be disposed of in a sink or toilet. When getting rid of non-prescription drugs, many users simply discard them in a waste receptacle or dispose of them in a sink or toilet.

All of these methods of drug disposal contain serious flaws and hazards.

Transporting prescription drugs to a DEA office or reverse distributor may be extremely time-consuming; as a result, people may put off the task, creating an increased chance of accidental use or intentional misuse of the prescription drugs, especially for particularly dangerous prescription drugs. Facilities known to be storing large quantities of prescription drugs, for either transportation or disposal, may be subject to break-ins or theft by staff. People transporting large quantities of prescription drugs from locations such as a long-term care facility may be subject to attacks from criminals, particularly if the prescription drugs are valuable if resold. Waiting for a local program also increases the chances of accidental use or intentional misuse of the prescription drugs.

Personally disposing of prescription and non-prescription drugs presents the risk of improper disposal, permitting drug abusers and children to gain access to the drugs. Moreover, personal disposal of drugs may be unfeasible for large quantities and dangerous if different drugs react chemically with each other when comingled. Simply throwing drugs out, flushing them down a toilet or washing them down a sink introduces them into the ground or water supply, potentially causing environmental contamination.

Prior art systems attempt to provide convenient and efficient disposal of prescription and non-prescription drugs. These systems combine the drugs with liquid neutralizing chemical compositions to destroy the drugs. These neutralizing chemical compositions have a specific pH composition and are usually included in a container to which the drugs can be added. The neutralizing chemical compositions dissolve the drugs, rendering them unusable as well as unpalatable. A user then throws out the container with the neutralizing chemical composition and dissolved drugs.

These prior art systems for drug disposal also contain major flaws.

Before, during and after use, the container can be damaged by expansion of the neutralizing chemical composition due to freezing, foaming or chemical reaction with the introduced drugs. Gases produced by the interactions of different drugs or by the dissolution process may also damage the container. Furthermore, because the neutralizing chemical composition remains in a liquid state, it may leak from the container after disposal. In addition to contamination from the dissolved drugs, the neutralizing chemical composition itself may cause ground and water pollution. Additionally, the neutralizing chemical compositions used require extensive pH balancing due to the numerous ingredients used in their manufacture. Minor manufacturing errors and different rates of ingredient break down may destabilize the neutralizing chemical composition, rendering it ineffective.

There is an unmet need for a system capable of destroying prescription and non-prescription drugs rapidly, effectively and on-demand without the risk of harm to the environment.

There is a further unmet need for a system capable of safely disposing of prescription and non-prescription drugs without the risk of causing damage to the system itself.

SUMMARY OF THE INVENTION

The present invention is a system that breaks down medical waste for safe disposal. The system includes a novel disposal solution for dissolving and dispersing the medical waste, as well as a hardening agent that solidifies the disposal solution to prevent it from contaminating the environment after disposal. The novel disposal solution includes a dispersion agent that dissolves the medical waste in addition to a neutralizer, which binds to the dissolved medical waste to render it inert. The disposal solution can optionally include defoaming, preservation and/or anti-freeze agents. The system may also include a vessel with a vented cap for storing the disposal solution prior to and during use. The vessel may also be used to discard the disposal solution and broken-down medical waste after the disposal solution solidifies.

BRIEF DESCRIPTION OF THE DRAWINGS

FIG. 1 illustrates an exploded and partially cutaway view of an exemplary embodiment of a disposal system for breaking down medical waste.

DETAILED DESCRIPTION OF INVENTION

For the purpose of promoting an understanding of the present invention, references are made in the text to exemplary embodiments of a medical waste disposal system, only some of which are described herein. It should be understood that no limitations on the scope of the invention are intended by describing these exemplary embodiments. One of ordinary skill in the art will readily appreciate that alternate but functionally equivalent components may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale. Instead, emphasis has been placed upon illustrating the principles of the invention. Like reference numerals in the various drawings refer to identical or nearly identical structural elements.

Moreover, the terms "about," "substantially" or "approximately" as used herein may be applied to modify any quantitative representation that could permissibly vary without resulting in a change in the basic function to which it is related. The terms "percent" or "percentage" as used herein refer to a volume percent or volume percentage.

FIG. 1 illustrates an exploded and partially cutaway view of an exemplary embodiment of a disposal system 100 for breaking down medical waste. Disposal system 100 includes disposal solution 10, hardening agent 20 and an optional vessel 30 having an opening 33 and a closure 36.

Disposal solution 10 is an aqueous solution that safely dissolves and disperses any medical waste it contacts. Disposal solution 10 includes a dispersion agent and a neutralizer. Optionally, disposal solution 10 can also include a defoaming agent, a preservation agent and/or an anti-freeze agent.

In the exemplary embodiment of disposal system 100, the dispersion agent of disposal solution 10 is a surfactant having a pH of about 6.5. In alternate embodiments, the dispersion agent may include, but is not limited to soaps, wetting agents, nonylphenol-ethoxylates, silicone polyethers, polydimethyl siloxanes and polysaccharides. In alternate embodiments, the dispersion agent has a pH ranging from about 6.2 to about 6.8. In the exemplary embodiment, the dispersion agent makes up about 1.0 percent of disposal solution 10. In alternate embodiments, the dispersion agent makes up between about 0.5 percent and about 1.5 percent of disposal solution 10. Adjusting the percentage of the dispersion agents adjusts the overall pH of disposal solution 10.

In the exemplary embodiment of disposal system 100, the neutralizer is activated carbon having porosity in the range of approximately 1 nm to 25 nm. The activated carbon may be in a granular, powdered, bead, pellet, fiber, cloth or any other form. In alternate embodiments, the activated carbon is further modified to be an impregnated carbon or a polymer-coated carbon. In the exemplary embodiment, the neutralizer makes up about 1 percent of disposal solution 10. In alternate embodiments, the neutralizer makes up between about 0.8 percent and about 1.2 percent of disposal solution 10.

Optionally, disposal solution 10 also includes a defoaming agent. The defoaming agents control expansion of disposal solution 10 during use, preventing it from rupturing containers such as optional vessel 30. The defoaming agent may include, but is not limited to a non-silicone defoaming agent. Defoaming agents may comprise between about 0.1 percent and about 0.2 percent of disposal solution 10. In the exemplary embodiment, the defoaming agent makes up about 0.15 percent of disposal solution 10.

Disposal solution 10 optionally includes a preservation agent. Preservation agents prevent break down of disposal solution 10 during storage and use, ensuring that disposal solution 10 retains the capability to dissolve and neutralize medical waste even after extended periods of time. Preservation agents may include, but are not limited to oxazolidines. The preservation agent may comprise between about 0.5 percent and about 1.5 percent of disposal solution 10. In the exemplary embodiment, the preservation agent makes up about 1.0 percent of disposal solution 10.

Another optional component of disposal solution 10 is an anti-freeze agent. The anti-freeze agents preclude disposal solution 10 from freezing during storage and use, preventing it from expanding and rupturing containers such as optional vessel 30. The anti-freeze agents may include, but are not limited to alcohol, propylene glycol, polyethylene glycol or glycerin. Anti-freeze agents may comprise between about 0.1 percent and about 10 percent of disposal solution 10.

As illustrated in FIG. 1, disposal system 100 also includes hardening agent 20. Hardening agent 20 may be provided in the single-dose packet of the exemplary embodiment or in a larger multi-dose package. In various embodiments, hardening agent 20 may be a solid or liquid chemical composition which, when added to disposal solution 10, causes disposal solution 10 to at least partially gel or solidify, preventing it from leaking from containers such as optional vessel 30. In the exemplary embodiment, hardening agent 20 is sodium polyacrylate. Alternate embodiments utilize cross-linked sodium polyacrylate as hardening agent 20.

As illustrated in FIG. 1, optional vessel 30 is a liquid-impermeable bottle having an opening 33 and a cap 36. Vessel 30 is preferably manufactured from a layer of polymer material, though alternate embodiments may comprise glass, metal or a combination of materials. In some embodiments, vessel 30 may be made from one or more layers of material, such as a liquid-impermeable yet gas-permeable fabric such as expanded polytetrafluoroethylene (Gore-Tex™). While vessel 30 has a cylindrical bottle shape in the exemplary embodiment, numerous other shapes are contemplated. The size of opening 33 permits insertion of solid or liquid medical waste. Cap 36 may be a standard closure or may have child-resistant features, such as a two-part cap 36 with a threaded inner closure member and an outer overcap. Cap 36 also includes at least one pressure relief aperture that provides an outlet for any gases generated within vessel 30 during use of disposal system 100. In various embodiments, cap 36 may form a threaded connection or a snap connection with vessel 30.

During use, a user adds medical waste such as a prescription drug to vessel 30 through opening 33. Once inside vessel 30, medical waste contacts disposal solution 10, which dissolves the medical waste and renders it inert. A user may repeat the process for additional medical waste or close vessel 30 using cap 36. Any gases produced during the neutralization process vent through opening 33 or through the pressure relief aperture in cap 36. After final use of disposal solution 10, the user adds hardening agent 20 to solidify disposal solution 10 before applying cap 36 and safely discarding the entire disposal system 100.

The amount of disposal solution 10 used may vary based on the amount of medical waste to be disposed. Likewise, the amount of hardening agent 20 and the size of optional vessel 30 vary in accordance with the amount of disposal solution 10. Large quantities of disposal solution 10 contained in large vessels 30 may be used for facilities which dispose of sizeable quantities of medical waste, such as long-term care facilities. Smaller quantities of disposal solution 10 may suffice for household use, with concomitantly smaller amounts of hardening agent 20 and a smaller vessel 30.

What is claimed is:

1. A disposal system for breaking down medical waste, consisting of:
    a disposal solution including a dispersion agent and a neutralizer, wherein said dispersion agent has a pH of between about 6.2 and about 6.8,
    wherein said dispersion agent is selected from the group consisting of:
        surfactants, soaps, nonylphenol-ethoxylates, silicone polyethers, polydimethyl siloxanes and polysaccharides,
    wherein said disposal solution includes at least one ingredient selected from the group consisting of: a defoaming agent, a preservation agent, and an anti-freeze agent; and
    a hardening agent capable of reacting with said disposal solution to create an at least partially solid mass.

2. The system of claim 1, wherein said dispersion agent makes up between about 0.5 percent and about 1.5 percent of said disposal solution.

3. The system of claim 1, wherein said dispersion agent makes up about 1.0 percent of said disposal solution.

4. The system of claim 1, wherein said dispersion agent has a pH of about 6.5.

5. The system of claim 1, wherein said neutralizer is activated carbon.

6. The system of claim 5, wherein said activated carbon has an average pore size of about 1 nm to about 25 nm.

7. The system of claim 1, wherein said neutralizer makes up between about 0.8 percent and about 1.2 percent of said disposal solution.

8. The system of claim 1, wherein said defoaming agent is a non-silicone defoaming agent.

9. The system of claim 1, wherein said defoaming agent makes up between about 0.1 percent and about 0.2 percent of said disposal solution.

10. The system of claim 1, wherein said preservation agent is an oxazolidine preservation agent.

11. The system of claim 1, wherein said preservation agent makes up between about 0.5 percent and about 1.5 percent of said disposal solution.

12. The system of claim 1, wherein said anti-freeze agent makes up between about 0.1 percent and about 10 percent of said disposal solution.

13. The system of claim 1, wherein said hardening agent is selected from a group consisting of: sodium polyacrylate and cross-linked sodium polyacrylate.

* * * * *